(12) United States Patent
Tsumori et al.

(10) Patent No.: US 7,906,595 B2
(45) Date of Patent: Mar. 15, 2011

(54) HYDROPHILIC GRAFT POLYMER

(75) Inventors: Takahiro Tsumori, Nishinomiya (JP); Norihiro Wakao, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/375,824

(22) PCT Filed: Aug. 7, 2007

(86) PCT No.: PCT/JP2007/065454
§ 371 (c)(1),
(2), (4) Date: Jan. 30, 2009

(87) PCT Pub. No.: WO2008/020556
PCT Pub. Date: Feb. 21, 2008

(65) Prior Publication Data
US 2010/0004397 A1    Jan. 7, 2010

(30) Foreign Application Priority Data
Aug. 14, 2006   (JP) ................. 2006-221267

(51) Int. Cl.
*C08F 283/06*   (2006.01)
(52) U.S. Cl. ........................ 525/403; 525/404
(58) Field of Classification Search .............. 525/403, 525/404
See application file for complete search history.

(56) References Cited

U.S. PATENT DOCUMENTS

| | | | |
|---|---|---|---|
| 4,206,155 A * | 6/1980 | Korber ...................... 525/301 |
| 4,528,334 A | 7/1985 | Knopf et al. |
| 4,612,352 A | 9/1986 | Schäfer et al. |
| 5,075,342 A * | 12/1991 | Ishigaki et al. ............. 521/27 |
| 5,318,719 A | 6/1994 | Hughes et al. |
| 5,326,825 A * | 7/1994 | Nasman et al. ............. 525/301 |
| 5,342,861 A * | 8/1994 | Raykovitz ................. 523/111 |
| 5,795,936 A * | 8/1998 | Lin et al. .................. 525/71 |
| 5,952,432 A | 9/1999 | Yamaguchi et al. |
| 6,139,826 A * | 10/2000 | Schraer et al. ............. 424/70.16 |
| 6,506,847 B1 * | 1/2003 | Song ........................ 525/322 |

FOREIGN PATENT DOCUMENTS

| | | |
|---|---|---|
| EP | 0 639 592 | 2/1995 |
| JP | 55-071710 | 5/1980 |
| JP | 01-103644 | 4/1989 |
| JP | 03-177406 | 8/1991 |
| JP | 07-053993 | 2/1995 |
| JP | 11-279220 | 10/1999 |
| JP | 2000-026510 | 1/2000 |
| JP | 2001-226441 | 8/2001 |

OTHER PUBLICATIONS

Supplementary European Search Report issued in Application No. 07792123.7-2109 dated Aug. 26, 2010, 4 pages.

* cited by examiner

*Primary Examiner* — Bernard Lipman
(74) *Attorney, Agent, or Firm* — Occhiuti Rohlicek & Tsao LLP

(57) ABSTRACT

A hydrophilic graft polymer having the reducing amount of the residual unsaturated monocarboxylic acid, and having very excellent temporal stability is provided.

The present invention relates to the hydrophilic graft polymer obtained by graft polymerization of monomer component containing unsaturated monocarboxylic acid onto polyalkylene oxide, wherein mole ratio of side chain moiety derived from the unsaturated monocarboxylic acid is more than 90% by mole relative to total side chain, and residual amount of unsaturated monocarboxylic acid is less than 200 ppm by mass relative to the total mass of said hydrophilic graft polymer.

18 Claims, No Drawings

HYDROPHILIC GRAFT POLYMER

CROSS-REFERENCE TO RELATED APPLICATIONS

This application is the National Stage of International Application No. PCT/JP2007/065454, filed on Aug. 7, 2007, which claims the priority of Japanese Application No. 2006-221267, filed on Aug. 14, 2006. The contents of both applications are hereby incorporated by reference in their entirety.

TECHNICAL FIELD

The present invention relates to a hydrophilic graft polymer. In detail, the present invention relates to a graft polymer useful for detergent builders, water treating agent, textile treating agent, dispersant, cement dispersing agent.

BACKGROUND ART

Various hydrophilic graft polymers obtained by graft-polymerization of unsaturated monomer component onto the main chain consisting of polyalkylene oxide have hitherto been developed, and have been used for various applications such as scale inhibitor, water treating agent, detergent builder, dispersant for poorly water soluble inorganic or organic materials (dispersant for inorganic pigments, dispersant for cement-water slurry), textile treating agent (for example, see U.S. Pat. Nos. 4,528,334; 4,612,352; EP-A-0639592; U.S. Pat. No. 5,952,432).

The above hydrophilic graft polymer is produced by graft polymerization accomplished by adding an unsaturated monomer such as acrylic acid, together with polymerization initiator and the like to a compound of polyalkylene oxide, and by heating them. In this case, there has been a problem that not a little amount of the unsaturated monomer component used as a raw material in the polymerizing reaction product after preparing the polymer is remaining. This is unfavorable with the view of productivity and performance of the polymer. Also, in particular, for human body contacting uses, reduction of toxicity and irritation due to residual monomer is required as low as possible. In order to solve such a problem, a hydrophilic graft polymer obtained by graft polymerizing a mono ethylenic unsaturated monocarboxylic acid and a mono ethylenic unsaturated dicarboxylic acid onto a polyether compound is disclosed in JP-A-2001-226441. Amount of the residual mono ethylenic unsaturated monocarboxylic acid in the polymer described in JP-A-2001-226441 is 900 ppm or less, and consequently, amount of residual monomer is relatively low compared with previous types of these graft polymers.

Also, the above hydrophilic graft polymer may not be good in temporal storage stability in relation to residual monomer. As a method to solve this problem, for example, in JP-A-11-279220, the production method of the hydrophilic graft copolymer containing the step performing the forced hydrolysis of the hydrophilic graft copolymer is disclosed.

DISCLOSURE OF INVENTION

However, considering from the productivity, the environmental loading and the safety of residual acrylic acid, the further reduction of residual unsaturated monomer component in the polymer has been required, and also, the graft polymer having more excellent temporal storage stability has been expected.

Therefore, an object of the present invention relates to provide a hydrophilic graft polymer having reduced amount of residual unsaturated monocarboxylic acid and very excellent temporal stability.

The present inventors have extensively investigated a way to solve the above problem, and found that amount of a residual monomer was able to be reduced when mole ratio of an unsaturated monocarboxylic acid in the monomer to be used in graft polymerization was increased, and completed the present invention. Namely, the present invention is to provide a hydrophilic graft polymer obtained by a graft polymerization of a monomer component containing an unsaturated monocarboxylic acid onto a polyalkylene oxide, characterized by mole ratio of side chain moiety derived from the above unsaturated monocarboxylic acid is more than 90% by mole relative to the total side chain, and residual amount of the unsaturated monocarboxylic acid relative to the total mass of the above hydrophilic graft polymer is less than 200 ppm by mass.

The hydrophilic graft polymer of the present invention is the highly pure polymer having more reduced amount of residual unsaturated monocarboxylic acid, and also, the polymer having the excellent temporal stability.

DESCRIPTION OF THE PREFERRED EMBODIMENT

Embodiments of the present invention are described in detail below.

The hydrophilic graft polymer of the present invention has the main chain consisting of a polyalkylene oxide, and the side chain obtained by a graft polymerization of a monomer component containing an unsaturated monocarboxylic acid. Each component constituting the graft polymer of the present invention is described in detail below.

[Polyalkylene Oxide]

A polyalkylene oxide constituting the main chain can be obtained by a polymerization of an alkylene oxide and a compound leading to a polymerization initiation.

The above compound leading to the polymerization initiation is particularly not limited as long as the compounds can react and/or polymerize with alkyleneoxide, and includes, specifically, water, alcohol, hydrogen, oxygen, carbon dioxide, halogenated hydrogen, ammonia, amine, hydroxylamine, carboxylic acid, acid halide, lactone, aldehyde, benzene, and the like, and these can be used alone or in combination of two or more kinds. In view of reaction efficiency, at least one kind selected from water, alcohol and amine is preferable, and alcohol is more preferable.

Alcohols include, for example, primary aliphatic alcohols having 1 to 50 carbon atoms, and preferably 1 to 30 carbon atoms such as methanol, ethanol, n-propanol, n-butanol; aromatic alcohols having 3 to 50 carbon atoms, and preferably 6 to 30 carbon atoms such as phenol, iso-propylphenol, octylphenol, tert-butylphenol, nonylphenol, naphthol; secondary alcohols having 3 to 50 carbon atoms, and preferably 3 to 18 carbon atoms such as iso-propyl alcohol, and alcohols obtained by oxidation of n-paraffin; tertiary alcohols having 4 to 50 carbon atoms, and preferably 4 to 18 carbon atoms such as tert-butanol; diols such as ethylene glycol, diethylene glycol, propanediol, butanediol, propylene glycol; triols such as glycerin, trimethylolpropane; polyols such as sorbitol, and these can be used alone or in a combination of two or more kinds. It should be noted that, from a viewpoint of addition of alkylenoxide to alcohol, aromatic alcohols are preferable, in particular, phenol of unsubstituted phenol is preferable.

Alkylene oxides include, for example, ethylene oxide, propylene oxide, isobutylene oxide, 1-butene oxide, 2-butene oxide, trimethylethylene oxide, tetramethylethylene oxide, butadiene mono oxide, styrene oxide, 1,1-diphenylethylene oxide, epifluorohydrin, epichlorohydrin, epibromohydrin, glycidol, butyl glycidyl ether, hexyl glycidyl ether, allyl glycidyl ether, phenyl glycidyl ether, 2-chloroethyl glycidyl ether, o-chlorophenyl glycidyl ether, ethylene glycol diglycidyl ether, bisphenol A diglycidyl ether, methacryl chloride epoxide, cyclohexene oxide, dihydronaphthalene oxide, vinylcyclohexene mono oxide, oxetane, tetrahydrofuran, 1,4-epoxycyclohexane, and the like. These can be used one kind or in combination of two or more kinds. Above all, in order to improve graft rate, it is preferable to have 50% or more by mole of ethylene oxide and/or propylene oxide, more preferable 75% or more by mole, particularly preferable 90% or more by mole as constituting unit.

Preferable average addition mole numbers of alkylene oxide are 10 to 150 moles, more preferably 10 to 100 moles, further preferably 20 to 80 moles.

These polyalkylene oxides may be purchased from the commercial products when said products are commercially available, or may be prepared per se. As the techniques to prepare polyalkylene oxide by per se, for example, by using the following procedure such as 1) anion polymerization using strong alkali material such as alkaline metal hydroxide, and alkoxide, or alkyl amine as basic catalyst; 2) cation polymerization using metal or half metal halide, mineral acid, acetic acid as catalyst; and 3) addition procedure of alkylene oxide to the compound leading to initiation point of polymerization, using coordination polymerization with a combination of alkoxide of metal such as aluminium, iron, zinc, alkaline earth metal compound, Lewis acid and the like; is exemplified.

Polyalkylene oxides may be the derivatives from polyalkylene glycol. These derivatives include, for example, the end group converted polyalkylene glycol of which the end functional group is converted, or cross-linked polyalkylene glycol obtained by the reaction of polyalkylene glycol and cross-linking agent having a plurality of groups such as carboxyl group, isocyanate group, amino group, halogen group. As the end group converted polyalkylene glycol, the polymer wherein at least one end hydroxyl group of the above polyalkylene glycol is esterified by aliphatic acid and anhydride thereof having 2 to 22 carbon atoms, such as acetic acid, acetic anhydride, and dicarboxylic acid such as succinic acid, succinic anhydride and adipic acid.

Number average molecular weight of the polyalkylene oxide is preferably 100,000 or less in upper limit, more preferably 50,000 or less, further preferably 10,000 or less, particularly preferably 5,000 or less. When number average molecular weight of polyalkylene oxide is in such a range, viscosity of polyalkylene oxide becomes suitable, and handling of the polymer during polymerization is easy. When number average molecular weight of polyalkylene oxide is in such a range, it is preferable to obtain the graft polymer having high water solubility. Lower limit of number average molecular weight of the polyalkylene oxide is not particularly limited, but preferably 100 or more, more preferably 200 or more, further preferably 300 or more. When number average molecular weight of the polyalkylene oxide is 100 or more, reduction of graft rate is suppressed, accordingly, amount of unreacted alkylene oxide is reduced. It should be noted that, number average molecular weight of the present invention adopts the value measured by the procedure described in examples to be described later.

[Monomer Component]

In the present invention, the monomer component includes, indispensably, the unsaturated monocarboxylic acid such as (meth) acrylic acid, crotonic acid, isocrotonic acid, α-hydroxyacrylic acid, α-hydroxymethylacrylic acid. Among unsaturated monocarboxylic acid, (meth) acrylic acid is preferable, and acrylic acid is further preferable from the standpoint of reducing amount of the residual monomer, and improving the dispersive power of the hydrophilic graft polymer. The unsaturated monocarboxylic acid may be used one kind alone or in combination with two or more kinds It should be noted that, as described below, as long as mole ratio of the side chain moiety derived from unsaturated monocarboxylic acid in the hydrophilic graft polymer is more than 90% by mole relative to total side chain, mole ratio of unsaturated monocarboxylic acid in monomer component is particularly not limited, and may be appropriately adjusted to obtain the above composition, and amount of unsaturated monocarboxylic acid in monomer component is preferably more than 90% by mole, more preferably 92% or more by mole, further preferably 95% or more by mole, especially preferably 100% by mole.

In the present invention, monomer components except the above unsaturated monocarboxylic acid are particularly not limited, and the monomer well known heretofore can be used. For example, hydrophilic monomers such as the unsaturated dicarboxylic acid monomers such as maleic acid, fumaric acid, itaconic acid; monomers having sulfonic acid group such as 2-acrylamide-2-methyl-propane sulfonic acid, (meth) allyl sulfonic acid, vinyl sulfonic acid, 2-hydroxy-3-allyloxy-1-propane sulfonic acid, 2-hydroxy-3-butene sulfonic acid; monomers having phosphonic acid group such as vinyl phosphonic acid, (meth)allyl phosphonic acid; monomers having hydroxyl group such as 2-hydroxyethyl(meth)acrylate, 2-hydroxypropyl (meth)acrylate, 3-hydroxypropyl(meth)acrylate, 2-hydroxybutyl(meth)acrylate, 4-hydroxybutyl (meth) acrylate, ethyl α-hydroxymethyl(meth)acrylate can be exemplified. Among these, from the standpoint of high efficiency of polymerization, weak acidity and easy handling, unsaturated acid is preferable, and the type having carboxylic acid group is more preferable. These monomers may be used alone, or in combination of two or more kinds.

Further, in addition to the above unsaturated monocarboxylic acid and the hydrophilic monomers, the other monomers copolymerizable with the monomer may be included. The other monomers, which is not limited particularly, include, for example, alkyl(meth)acrylates such as methyl (meth)acrylate, ethyl(meth)acrylate, butyl(meth)acrylate, Cyclohexyl (meth)acrylate, obtained by esterification of (meth)acrylic acid and alcohol having 1 to 18 carbon atoms; monomers having amide group such as (meth)acrylamide, dimethylacrylamide, isopropylacrylamide; vinyl esters such as vinyl acetate; alkenes such as ethylene, propylene; aromatic vinyl based monomers such as styrene, styrene sulfonic acid; maleimide derivatives such as maleimide, phenylmaleimide, cyclohexylmaleimide; vinyl based monomers having nitrile group such as (meth) acrylonitrile; vinyl based monomers having aldehyde group such as (meth) acrolein; alkyl vinyl ethers such as methyl vinyl ether, ethyl vinyl ether, butyl vinyl ether; vinyl chloride, vinylidene chloride, allyl alcohol; monomers having the other functional groups such as vinyl pyrrolidone. The other monomer can be used one kind or in combination with two or more kinds. In addition, when the other monomers are included, in the graft chain constituted by the monomer components containing the unsaturated monocarboxylic acid, addition form of component unit derived from each monomer component is not limited particularly, for example, random addition or block addition may be allowed.

[Hydrophilic Graft Polymer]

The hydrophilic graft polymer of the present invention contains the structure provided by graft polymerization of the monomer component comprising the unsaturated monocarboxylic acid onto the main chain of polyalkylene oxide.

Grafting amount of monomer component is not limited particularly, but mass ratio of the part derived from polyalkylene oxide and the part derived from monomer is preferably 50:50 to 90:10, and more preferably 55:45 to 85:15, further preferably 60:40 to 80:20. When amount of the part derived from monomer (grafted part) is too small, graft polymer cannot exert the performance sufficiently. Alternatively, when amount of the part derived from monomer (grafted part) is too much, polymerization system becomes high viscous, and may not be allowed to stir, therefore, a large amount of unreacted monomer may be left in the product. It should be noted that, it is difficult to graft polymerize the graft chain derived from monomer selectively onto the specific position of polyoxyalkylene chain of polyoxyalkylene based compounds. Therefore, in case of calculating the above mass ratio, "monomer derived part" means total amount of side chain provided by graft polymerizing onto the polyoxyalkylene chain.

In the hydrophilic graft polymer of the present invention, mole ratio of side chain part derived from unsaturated monocarboxylic acid in the hydrophilic graft polymer relative to total side chain exceeds more than 90% by mole, preferably 92% or more by mole, more preferably 95% or more by mole, and further preferably 100% by mole. When the mole ratio of side chain part exceeds 90% by mole, this composition contributes to improve the stability of product.

Number average molecular weight of the hydrophilic graft polymer of the present invention is not limited particularly, however, it is preferably 1,000 to 1,000,000, more preferably 1,500 to 500,000, further preferably 2,000 to 100,000. When the value of number average molecular weight is 1,000,000 or less, viscosity of the polymer is suitable for handling. Alternatively, when the value of number average molecular weight is 1,000 or more, the polymer exerts sufficient dispersive power. It should be noted that, number average molecular weight employs the values measured by the method in examples to be described later.

The following rate of change (absolute value) of number average molecular weight of the hydrophilic graft polymer after 3 hours reflux is preferably 10% or less, more preferably 8% or less, further preferably 5% or less. Less rate of change is preferable, therefore, lower limit of rate of change is not limited particularly, however, it is preferably 0% or more, more preferably 0.5% or more.

Rate of change=|{($Mn_0$–$Mn_1$)/$Mn_0$}×ϕ|

$Mn_0$: number average molecular weight before reflux;
$Mn_1$: number average molecular weight after reflux It should be noted that, $Mn_1$ is the number average molecular weight measured after refluxing under the condition in the examples to be described later (estimation method: change (2) of number average molecular weight by accelerated hydrolysis test). The hydrophilic graft polymer of the present invention exhibits high mole ratio of side chain derived from unsaturated monocarboxylic acid, is insusceptible to hydrolysis under high temperature, and has a excellent storage stability, for example, compared with the polymer having much amount of side chain part derived from unsaturated dicarboxylic acid.

In the hydrophilic graft polymer of the present invention, residual amount of unsaturated monocarboxylic acid relative to total mass of polymer is less than 200 ppm by mass, more preferably less than 100 ppm by mass, further preferably less than 50 ppm by mass. When amount of the unsaturated monocarboxylic acid in the monomer to be graft polymerized is controlled at the level of not less than a certain value, the polymer having very low amount of residual unsaturated monocarboxylic acid such as less than 200 ppm by mass can be obtained. It is understood that when much amount of the other monomer than unsaturated monocarboxylic acid such as unsaturated dicarboxylic acid is included in monomer, residual amount of unsaturated monocarboxylic acid is increased by the difference of copolymerizability.

In the case where the hydrophilic graft polymer is applied for human body contacting use, when amount of monocarboxylic acid is less than 200 ppm by mass, this polymer is preferable because of less toxicity and less irritation by residual unsaturated monocarboxylic acid. It should be noted that, "total mass of the hydrophilic graft polymer" in the present invention indicates the mass converted to solid amount in the polymer (aqueous solution). Also, solid amount and residual amount of the unsaturated monocarboxylic acid are employed the values measured by the method in examples to be described later.

[Production Method]

Production method of the hydrophilic graft polymer of the present invention is not limited particularly, and this polymer can be produced by referring appropriately to the conventionally well known knowledge.

In graft polymerization, first of all, polyalkylene oxide forming the main chain of graft polymer and monomer components forming the side chain of the graft polymer are provided to desired amounts, respectively. In this time, the amount of each component is preferably adjusted so that the desired composition ratio described above can be obtained.

In graft polymerization, the well known radical polymerization initiators as polymerization initiator may be used. Organic peroxides may be preferably used as radical polymerization initiators.

Organic peroxides include, for example, ketone peroxides such as cyclohexanone peroxide, methyl ethyl ketone peroxide, methylcyclohexanone peroxide, methylacetoacetate peroxide, 3,3,5-trimethylcyclohexanone peroxide; peroxy ketals such as 1,1-bis(tert-hexylperoxy)-3,3,5-trimethylcyclohexane, 1,1-bis(tert-hexylperoxy) cyclohexane, 1,1-bis(tert-butylperoxy)-3,3,5-trimethylcyclohexane, 1,1-bis(tert-butylperoxy)-2-methylcyclohexane, 1,1-bis(tert-butylperoxy) cyclohexane, 2,2-bis(tert-butylperoxy)butane, n-butyl-4,4-bis(tert-butylperoxy)valerate, 2,2-bis(tert-butylperoxy) octane;

hydroperoxides such as p-menthane hydroperoxide, diisopropylbenzene hydroperoxide, 1,1,3,3-tetramethylbutyl hydroperoxide, cumene hydroperoxide, tert-hexyl hydroperoxide, tert-butyl hydroperoxide, 2,5-dimethylhexane-2,5-dihydroperoxide, 2-(4-methylcyclohexyl)-propane hydroperoxide; dialkyl peroxides such as α,α'-bis(tert-butylperoxy)-p-diisopropylbenzene, dicumyl peroxide, 2,5-dimethyl-2,5-bis(tert-butylperoxy)hexane, tert-butyl cumyl peroxide, di-tert-butylperoxide, 2,5-dimethyl-2,5-bis(tert-butylperoxy)hexyne-3, α,α'-bis(tert-butylperoxy)-p-isopropylhexyne; diacyl peroxides such as isobutyryl peroxide, 3,3,5-trimethylcyclohexanoyl peroxide, octanoyl peroxide, lauroyl peroxide, stearoyl peroxide, succinic acid peroxide, m-toluoyl peroxide, benzoyl peroxide, acetyl peroxide, decanoyl peroxide, 2,4-dichlorobenzoyl peroxide; peroxydicarbonates such as di-n-propyl peroxydicarbonate, di-isopropyl peroxydicarbonate, bis-(4-tert-butylcyclohexyl)peroxydicarbonate, di-2-ethoxyethyl peroxydicarbonate, di-2-ethylhexyl peroxydicarbonate, di-3-methoxybutyl peroxydicarbonate, di-sec-butyl peroxydicarbonate, di(3-methyl-3-methoxybutyl)

peroxydicarbonate, dimyristyl peroxydicarbonate, di-methoxyisopropyl peroxydicarbonate, diallyl peroxydicarbonate; peroxyesters such as α,α'-bis(neodecanoperoxy) diisopropylbenzene, cumyl peroxyneodacanoate, 1,1,3,3-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxy pivalate, tert-butyl peroxypivalate, 1,1,3,3-tetramethylbutyl peroxy-2-ethylhexanoate, 2,5-dibutyl-2,5-bis (2-ethylhexanoylperoxy)hexane, 1-cyclohexyl-1-methylethyl peroxy-2-ethylhexanoate, tert-hexyl peroxy-2-ethylhexanoate, tert-butyl peroxy-2-ethylhexanoate, tert-butyl peroxyisobutyrate, tert-hexyl peroxyisopropyl monocarbonate, tert-butylperoxy maleic acid, tert-butyl peroxy-3,5,5-trimethylcyclohexanoate, tert-butyl peroxylaurate, 2,5-dibutyl-2,5-bis(m-toluoylperoxy)hexane, tert-butyl peroxyisopropyl monocarbonate, tert-butyl peroxy-2-ethylhexyl monocarbonate, tert-hexyl peroxybenzoate, 2,5-dimethyl-2,5-bis(benzoylperoxy)hexane, tert-butyl peroxy acetate, tert-butyl peroxy-m-toluoylbenzoate, tert-butyl peroxy benzoate, bis(tert-butylperoxy)isophthalate, cumyl peroxy octoate, tert-hexyl peroxy neohexanoate, cumyl peroxy neohexanoate; the other organic peroxides such as tert-butyl peroxy allyl carbonate, tert-butyl trimethylsilyl peroxide, acetylcyclohexyl sulfonyl peroxide. Among these organic peroxides, di-tert-butyl peroxide, tert-butyl hydroperoxide, octanoylperoxide, lauroylperoxide, benzoylperoxide, cumene hydroperoxide etc. are suitable for use. These organic peroxides can be used alone or in combination with two or more kinds.

An amount of radical polymerization initiator to be used in graft polymerization is not limited particularly, however, it is preferably 0.1 to 15% by mass relative to total amount of monomer component to be used in graft polymerization, more preferably 0.5 to 10% by mass, further preferably 1 to 7% by mass. When the amount of radical polymerization initiator is too small, graft rate of monomer component onto the polyalkylene oxide chain may be reduced. Alternatively, when the use amount of radical polymerization initiator is too large, it is not preferable in view of cost, and initiator segment may greatly influence on the property of graft polymer.

Addition form of the radical polymerization initiator is not limited particularly. However, it is preferable to be added with monomer component simultaneously, and also, in a state without being mixed with polyalkylene oxide.

In graft polymerization, in addition of the above radical polymerization initiator, degradable catalyst for radical polymerization initiator and reducing compound may be added into reaction system. Degradable catalysts for radical polymerization initiator include, for example, metal halides such as lithium chloride, lithium bromide; metal oxides such as titanium oxide, silicon dioxide; metal salts of inorganic acid such as hydrochloric acid, hydrobromic acid, perchloric acid, sulfuric acid, nitric acid; carboxylic acids such as formic acid, acetic acid, propionic acid, butyric acid, isobutyric acid, benzoic acid, esters thereof and metallic salts thereof; heterocyclic amines such as pyridine, indole, imidazole, carbazole, and derivative thereof. These degradable catalysts can be used one kind alone or in combination of two or more kinds.

Also, reducing compounds include, for example, organic metal compounds such as ferrocene;
inorganic compounds, that can release the metallic ion such as iron, copper, nickel, cobalt, manganese, such as iron naphthenate, copper naphthenate, nickel naphthenate, cobalt naphthenate, manganese naphthenate; inorganic compounds such as boron trifluoride etherate, potassium permanganate, perchloric acid; sulfur containing compounds such as sulfur dioxide, sulfurous acid salt, sulfuric acid ester, bisulfurous acid salt, thiosulfuric acid salt, sulfoxylic acid salt, benzene sulfinic acid and substituted compounds thereof, cyclic sulfinic acids such as analogues of para-toluene sulfinic acid; mercapto compound such as octyl mercaptan, dodecyl mercaptan, mercapto ethanol, α-mercaptopropionic acid, thioglycolic acid, thiopropionic acid, α-thiopropionic acid sodiosulfopropyl ester, α-thiopropionic acid sodiosulfoethyl ester; nitrogen containing compound such as hydrazine, β-hydroxyethylhydrazine, hydroxylamine; aldehyde such as formaldehyde, acetaldehyde, propionaldehyde, n-butylaldehyde, isobutylaldehyde, isovalerianaldehyde; ascorbic acid and the like. These reducing compounds, also, may be used one kind alone or in combination of two or more kinds.

It is preferable to polymerize the hydrophilic graft polymer of the present invention in nonaqueous solvent, and also, is preferable to contain the amount of alcohols such as isobutyl alcohol, n-butyl alcohol, tert-butyl alcohol, ethylene glycol, diethylene glycol, triethylene glycol, propylene glycol, or toluene derivatives except water as low as possible. Specifically, the amount of solvent is preferably 5% or less by mass relative to total amount of reaction system, more preferably 3% or less by mass, further preferably practically 0. "The amount of solvent is practically 0" means the state, wherein the solvent is not added positively in graft polymerization, and contamination of solvent of impurity level is allowed. Or, it is preferable to remove the solvent from the reaction system immediately after addition. By containing the solvent as low as possible, or removing the solvent immediately, it is possible to graft polymerize the monomer component onto the polyalkylene oxide chain efficiently.

The temperature during graft polymerization is preferably 50° C. or more, more preferably 70° C. or more, further preferably 120° C. to 150° C. When the polymerization temperature is too low, viscosity of the reaction solution becomes too high, and it is difficult to perform the graft polymerization smoothly, therefore, graft rate of monomer component may be reduced. Alternatively, when the polymerization temperature is too high, thermal decomposition of polyalkylene oxide and resulting graft polymer may be generated. It should be noted that, it is unnecessary to keep the temperature in graft polymerization constant in progress of the polymerization reaction. For example, polymerization may start at room temperature, and the temperature of polymerization solution may be elevated at predetermined point with appropriate elevating time or elevating rate, and then the temperature may be kept at predetermined temperature, or polymerization temperature may be changed (elevating the temperature or decreasing the temperature) with time in progress of polymerization in response to the addition method of monomer component or polymerization initiator and the like.

Polymerization time is not limited particularly, however, it is preferably 60 to 420 minutes, more preferably 90 to 390 minutes, further preferably 120 to 360 minutes. In the present invention, the time when unsaturated monocarboxylic acid is contacted with initiator is defined as 0 minute (polymerization starting time).

As pressure of reaction system, any condition such as under normal pressure (atmospheric pressure), reduced pressure, or increased pressure is allowed, but from viewpoint of molecular weight of the resulting polymer, it is preferable to carry out the polymerization under normal pressure or increased pressure in sealed reaction system. In addition, considering from the facilities such as pressurized equipment or pressure reducing equipment and pressure-tight reaction vessel or piping, it is preferable to carry out the polymerization under normal pressure (atmospheric pressure). As atmosphere of reaction system, air atmosphere may be allowed, but inert gas atmosphere is preferable, for example, it is preferable to be replaced with inert gas such as nitrogen in the reaction system before start of polymerization.

In graft polymerization, it is preferable to start polymerization by charging all or part of polyalkylene oxide, which may be formed as the main chain of graft polymer, into the reaction system. Among monomer components, unsaturated monocarboxylic acid is preferably added dropwise after charging polyalkylene oxide. For example, the production scheme, in which total amount of polyalkylene oxide is charged into the reaction system, and then, temperature of reaction system is increased to the predetermined level, and then unsaturated monocarboxylic acid and radical polymerization initiator as required are separately added dropwise to proceed the graft polymerization reaction, is exemplified. Such a scheme is preferable because molecular weight of resulting graft polymer can be controlled easily. Graft polymerization may be performed by any system such as batch, semi-batch or continuous system.

After completion of dropping, stirring may be continued under maintaining the polymerization temperature to reduce the residual amount of monomer as required. As stirring time in this case, 30 to 360 minutes is preferable, 60 to 180 minutes is more preferable, and 60 to 120 minutes is further preferable.

By using such a way, resulting reaction products obtained by graft polymerization of monomer component having unsaturated monocarboxylic acid onto the polyalkylene oxide may be post-treated by adding peroxide and/or azo based compound to the hydrophilic graft polymer in order to reduce the amount of residual monomer furthermore.

In post-treatment, the hydrophilic graft polymer may be preferably prepared in aqueous solution. Concentration of the hydrophilic graft polymer in aqueous solution is not limited particularly, however, in view of economy of product form (transportation cost), high concentration is preferred, 40% by mass or more is preferable, 50% by mass or more is more preferable, 90% by mass or more is most preferable, Peroxides include inorganic peroxide (hydrogen peroxide, persulfuric acid salt (sodium persulfate, potassium persulfate, ammonium persulfate, and the like), peroxoborate, dithionite, hydrogensulfite, disulfite, and the like); organic peroxide (compounds exemplified as polymerization initiator, peracetic acid, peracetates (sodium peracetate and the like), percarbonates (sodium percarbonate and the like) and the like. These peroxides may be used alone or in the combination of two or more kinds. Among these, water soluble compounds are preferable, inorganic peroxides are more preferable, hydrogen peroxide is most preferable. It should be noted, when peroxides are used as additives in post-treatment, peroxides are preferably different type from polymerization initiator used in polymerization. In addition, when peroxides are used in post-treatment, it is preferable to use the decomposition accelerating agent to promote the decomposition of peroxides in combination with peroxides. The decomposition accelerating agents include reducing agents such as amines, ascorbic acid, iron; alkali metal hydroxide such as sodium hydroxide, potassium hydroxide. These can be used alone, or in combination with two or more kinds. As the decomposition accelerating agent, reducing agent is preferable, ascorbic acid is most preferable. Addition amount of the decomposition accelerating agent is not limited particularly, however, in view of decomposition accelerating action, it is preferably 80 to 120% by mass, more preferably 90 to 110% by mass relative to peroxides.

Azo based compounds include azonitrile based compound such as 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(2,4-dimethyl-4-methoxyvaleronitrile); azoamidine based compound such as 2,2'-azobis(2-amidinopropnane) dihydrochlorides, 2,2'-azobis[2-(5-methyl-2-imidazolin-2-yl)propane]dihydrochlorides, 2,2'-azobis[2-(2-imidazolin-2-yl)propane]dihydrochlorides, 2,2'-azobis[2-(2-imidazolin-2-yl)propane]; azoamide based compound such as 2,2'-azobis{2-methyl-N-[1,1-bis(hydroxymethyl)-2-hydroxy ethyl]propionamide}, 2,2'-azobis[2-methyl-N-(2-hydroxyethyl)propionamide], 2,2'-azobis(2-methylpropionamide) dihydrate; azoalkyl based compound such as 2,2'-azobis(2,4,4-trimethylpentane), 2,2'-azobis(2-methylpentane); 2-cyano-2-propylazoformamide; 4,4'-azobis(4-cyanovaleric acid); dimethyl 2,2'-azobis(2-methylpropionate); 2,2'-azobis(2-hydroxymethylpropionitrile). These azo based compounds can be used one kind alone or in combination with two kinds or more. Among them, water soluble compounds (2,2'-azobis(2-amidinopropane) dihydrochlorides, 2,2'-azobis[2-(5-methyl-2-imidazolin-2-yl)propane]dihydrochlorides, 2,2'-azobis[2-(2-imidazolin-2-yl)propane]dihydrochlorides and 2-cyano-2-propylazoformamide) are preferable.

The temperature of post-treatment is preferably 100° C. or less, more preferably 80° C. or less, further preferably 60° C. or less. In addition, post-treatment is preferably performed at room temperature (20 to 25° C.) or more, and may be performed under the reflux. In addition, time of post-treatment is, depending on reaction temperature or additives to be used, preferably 10 minutes or more, more preferably 30 minutes or more, further preferably 60 minutes to 120 minutes.

The usage of peroxides and/or azo based compound in post-treatment is preferably 0.01 to 10% by mass, more preferably 0.05 to 5% by mass, further preferably 0.1 to 2% by mass relative to the graft polymer. When it is within the above range, reduction effect of residual unsaturated monocarboxylic acid can be sufficiently exerted. In addition, when reducing agent is used in combination of peroxides, the usage is preferably 0.01 to 10% by mass, more preferably 0.05 to 5% by mass, further preferably 0.1 to 2% by mass relative to the hydrophilic graft polymer.

Addition procedure of peroxides and azo based compound in post-treatment is not limited particularly, however, it may be preferably in the form of powder or liquid, and the liquid form is preferable in view of easiness of production. When it is used as liquid, use as aqueous solution is most preferable.

In addition, when two or more kinds of additives are used, these may be added dropwise simultaneously, or added by dividing into two steps or more.

Hydrophilic graft polymer obtained by the above production method exhibits less than 200 ppm by mass of residual amount of unsaturated monocarboxylic acid relative to total mass of hydrophilic graft polymer, and rate of change of number average molecular weight is within 10% after three hours under refluxing condition.

In the product manufactured by such a method, residual polyalkylene oxide can exist besides the hydrophilic graft polymer and residual monomer. Hydrophilic graft polymer is purified from the product and can be used for specified uses, and also, the product can be used for specified use as it is. Action such as dispersibility can be maintained even if the product is used for specified uses as it is. In view of production efficiency, it is preferable to use the product for specified uses as it is without purification steps.

The hydrophilic graft polymer of the present invention is effective for improving the detergency performance by adding to detergent, more preferably liquid detergent, further preferably liquid detergent for human body, due to having the excellent compatibility with surfactant agent.

The hydrophilic graft polymer of the present invention is useful for detergent builder, water treating agent, textile treating agent, dispersant, cement dispersing agent and the like due to its significant excellence of dispersing action of solid particles. The hydrophilic graft polymer of the present invention can be used by dissolving in a solvent such as water, alcohol as it is, or can be used by adding base. Bases include, for example, monovalent metallic salts such as sodium salt, potassium salt; bivalent metallic salt such as calcium salt; trivalent metallic salt such as aluminum; organic amine salt such as ammonium salt, monoethanolamine, triethanolamine. In this case, water is preferable as solvent.

When the hydrophilic graft polymer of the present invention is used as water treatment agent, it may be provided as a composition formulated with polyphosphoric acid salt, phosphonic acid salt, anti-corrosion agent, slime control agent, chelating agent. In each case, it is useful for scale inhibition of cooling water circulation system, boiler water circulation system, seawater desalination plant, pulp digester, black liquor condensing kettle and the like. In addition, well known water soluble polymer may be included within the range of no affecting performance or effect of these polymers. Amount of the polymer of present invention in water treatment agent is not limited particularly.

When the hydrophilic graft polymer is used as textile treating agent, other additives can be included as necessary. Other additives include at least one component selected from the group consisting of stain, peroxide and surfactant. These stain, peroxide and surfactant are not limited particularly, for example, materials used as well known textile treating agent can be diverted. Ratio of the polymer of the present invention and the above additives is not limited particularly, but the above additives is formulated with the ratio of 0.1 to 100 parts by mass relative to one part by mass of the polymer of the present invention, preferably 0.1 to 100 parts by mass, more preferably 0.2 to 80 parts by mass. Textile treating agent can be used in any step of scouring, dyeing, bleaching or soaping in textile treatment. For example, when textile treating agent of the present invention is applied to scouring step, it is preferable for the textile treating agent to contain alkaline agent and surfactant in addition to the hydrophilic graft polymer of the present invention. In addition, when the textile treating agent of the present invention is applied to bleaching step, it is preferable to contain peroxides and silicate based agents such as sodium silicate, which is a decomposition retardant for alkaline bleaching agent, in addition to the hydrophilic graft polymer of the present invention. In addition, textile treating agent containing the polymer of the present invention may include the other polymer than the polymer of present invention within the range of no affecting performance or effect on these polymers. Amount of the polymer of the present invention in textile treating agent is not limited particularly, but it is preferable to contain 1 to 100% by mass relative to total amount of textile treating agent, more preferably 5 to 100% by mass.

The fibers, to which textile treating agent containing the polymer of the present invention can be used, is not limited particularly, however it includes, for example, cellulose based fibers such as cotton, hemp; chemical fibers such as nylon, polyester; animal fibers such as wool, silk; semi synthetic fibers such as rayon silk; and textiles and blended fabrics thereof. In addition, when the textile treating agents containing the polymer of the present invention are used in scouring step, it is preferable to formulate the polymer of present invention with alkaline agent and surfactant. When used in bleaching step, it is preferable to formulate the polymer of present invention with peroxides and silicate based agents such as sodium silicate as decomposition retardant agent for alkaline bleaching agent.

When the hydrophilic graft polymer of the present invention is used as dispersing agent, the other ingredients can be included as necessary. The other ingredients include at least one compound selected from polymeric phosphoric acid, polymeric phosphoric acid salt, phosphonic acid, phosphonic acid salt, polyvinyl alcohol and anion modified polyvinyl alcohol. In any case, this dispersing agent can exert an excellent performance as a dispersing agent for the inorganic pigment etc. such as heavy or light calcium carbonate, clay to be used in paper coating. For example, by adding small amount of pigment dispersing agent of the present invention to inorganic pigment for dispersing into water, high concentrated inorganic pigment slurry such as high concentrated calcium carbonate slurry having low viscosity, high fluidity, and excellent temporal stability of performances thereof can be produced. Usage of pigment dispersing agent is preferably 0.05 to 2.0 parts relative to 100 parts by mass of pigment.

When the hydrophilic graft polymer of the present invention is used as cement dispersing agent, the other ingredients may be used as necessary. When the cement dispersing agent containing the hydrophilic graft polymer of the present invention is used for cement composition such as cement mortar, and concrete, the dispersing property thereof is improved by the hydrophilic graft polymer of the present invention, and high fluidity is exerted without a big hardening delay due to addition and usable time can be prolonged. Therefore, the workability for mortar work or cement work is extremely improved. Accordingly, the cement dispersing agent of the present invention can be used, for example, as fluidizer of ready-mixed concrete and other concretes. In particular, it is easily accomplished to produce the ready-mixed concrete with formulation of high water reducing rate as high-performance AE water reducing agent of plant simultaneous addition type. Amount of the polymer of the present invention in the cement dispersing agent is not limited particularly.

EXAMPLES

The present invention will be described more in detail referring to the examples below, but the present invention is not limited only in the following examples.

Example 1

465 parts by weight of phenoxy polyethylene glycol (20 average addition moles of ethylene oxide) having 974 of number average molecular weight, which is melted at 60° C. or more, was charged into the stainless-steel reactor (2 L of capacity) equipped with thermometer, stirrer, nitrogen inlet tube and reflux condenser, and was heated up to 120° C. under nitrogen atmosphere. Then, maintaining the temperature between 125 to 131° C., 7.8 parts by weight of di-tert-butylperoxide (Kayabutyl D; manufactured by Kayaku Akzo Corporation) was continuously added dropwise over 195 minutes. 181 parts by weight of acrylic acid (100% by mole: molar ratio in monomers) was continuously added dropwise during 225 minutes after 20 minutes of starting the addition of di-tert-butylperoxide, then, it was continued to stir for 70 minutes, further it was cooled down to 60° C., and diluted by 267 parts by weight of water, furthermore, 42 parts by weight of 2% by weight hydrogen peroxide solution and 42 parts by weight of 2% by weight aqueous solution of L-ascorbic acid were added, and it was treated in 1 hour at 60° C. to obtain 1004.8 parts by weight of hydrophilic graft polymer (solid contents: 65.2% by mass). By measuring the amount of residual acrylic acid using the below method, residual amount of acrylic acid was 10 ppm or less by mass relative to the mass of hydrophilic graft polymer.

Example 2

510 parts by weight of phenoxy polyethylene glycol (20 average addition moles of ethylene oxide) having 974 of number average molecular weight, which was melted at 60° C. or more, 19 part by weight of maleic anhydride (9.0% by mole:molar ratio in monomers), and 0.7 parts by weight of water were charged into the stainless-steel reactor (2 L of capacity) equipped with thermometer, stirrer, nitrogen inlet tube and reflux condenser, and the mixture was allowed to stand for 1 hour at 60° C. under nitrogen atmosphere while stirring. Subsequently, the mixture was heated up to 128° C. while maintaining the temperature between 125 to 131° C., 8 parts by weight of di-tert-butylperoxide (Kayabutyl D; manufactured by Kayaku Akzo Corporation) was continuously added dropwise during 195 minutes. 142 parts by weight of acrylic acid (91.0% by mole:molar ratio in monomers) was continuously added dropwise over 225 minutes after 20 minutes of starting the addition of di-tert-butylperoxide, then, it was continued to stir for 70 minutes. Further, it was cooled down to 60° C., and was diluted by 393 parts by weight of water, furthermore, 40 parts by weight of 1.75% by weight hydrogen peroxide solution and 22 parts by weight of 3.25% by weight of aqueous solution of L-ascorbic acid were added, and the mixture was treated in 1 hour at 60° C. to obtain 1134.7 parts by weight of hydrophilic graft polymer (solid contents: 60.0% by mass). By measuring the amount of residual acrylic acid and residual amount of maleic acid using the following method, residual amount of acrylic acid was 178 ppm by mass, and residual amount of maleic acid was 750 ppm by mass relative to the mass of hydrophilic graft polymer.

Example 3

510 parts by weight of alkylpolyethylene glycol (Softanol-150: manufactured by NIPPON SHOKUBAI Co., Ltd.: 15 average addition moles of ethylene oxide) having 862.2 of number average molecular weight, which was melted at 60° C. or more, was charged into the stainless-steel reactor (2 L of capacity) equipped with thermometer, stirrer, nitrogen inlet tube and reflux condenser, and it was heated up to 120° C. under nitrogen atmosphere while stirring and 8 parts by weight of di-tert-butylperoxide (Kayabutyl D; manufactured by Kayaku Akzo Corporation) was continuously added dropwise while maintaining the temperature between 125 to 131° C. over 195 minutes. 161 parts by weight of acrylic acid (100% by mole:molar ratio in monomers) was continuously added dropwise over 225 minutes after 20 minutes of starting the addition of di-tert-butylperoxide, then it was continued to stir for 70 minutes. Further, it was cooled down to 60° C., and diluted by 400 parts by weight of water, furthermore, 40 parts by weight of 1.75% by weight hydrogen peroxide solution and 21 parts by weight of 3.25% by weight of aqueous solution of L-ascorbic acid were added, and the mixture was treated in 1 hour at 60° C. to obtain 1140.0 parts by weight of the hydrophilic graft polymer (solid contents: 59.7% by mass).

By measuring the amount of residual acrylic acid using the following method, residual amount of acrylic acid was 25 ppm by mass relative to the mass of hydrophilic graft polymer.

Comparative Example 1

510 parts by weight of phenoxy polyethylene glycol (20 average addition moles of ethylene oxide) having 974 of number average molecular weight, which was melted at 60° C. or more, 37 parts by weight of maleic anhydride (18.1% by mole:molar ratio in monomers), and 1.4 parts by weight of water, were charged into the stainless-steel reactor (2 L of capacity) equipped with thermometer, stirrer, nitrogen inlet tube and reflux condenser, and the mixture was allowed to stand for 1 hour at 60° C. under nitrogen atmosphere while stirring. Subsequently, the mixture was heated up to 128° C., and 8 parts by weight of di-tert-butylperoxide (Kayabutyl D; manufactured by Kayaku Akzo Corporation) was continuously added dropwise while maintaining the temperature between 125 to 131° C. over 195 minutes. 124 parts by weight of acrylic acid (81.9% by mole:molar ratio in monomers) was continuously added dropwise over 225 minutes after 20 minutes of starting the addition of di-tert-butylperoxide, then it was continued to stir for 70 minutes. Further, it was cooled down to 60° C., and diluted by 400 parts by weight of water, furthermore, 40 parts by weight of 1.75% by weight hydrogen peroxide solution and 21 parts by weight of 3.25% by weight of aqueous solution of L-ascorbic acid were added, and the mixture was treated in 1 hour at 60° C. to obtain 1141.4 parts by weight of hydrophilic graft polymer (solid contents: 59.7% by mass). By measuring the amount of residual acrylic acid and residual maleic acid using the below method, residual amount of acrylic acid was 210 ppm by mass and residual amount of maleic acid was 890 ppm by mass relative to the mass of hydrophilic graft polymer.

[Measuring Method of Solid Parts of Polymer (in Aqueous Solution)]

About 0.5 g of polymer (aqueous solution) is weighed together with aluminum pan predetermined the mass thereof, and is dried in oven set at 130° C. for 1 hour. Solid contents (% by mass) of polymer (aqueous solution) can be calculated by the following formula (1).

(Mass of the polymer after drying−Mass of aluminum pan)/(Mass of the polymer before drying−Mass of aluminum pan)×100     Formula (1)

Also, mass converted to solid parts of the polymer (aqueous solution) are determined by the following formula (2).

Mass of the polymer (in aqueous solution)×Solid parts of the polymer (in aqueous solution)/100     Formula (2)

[Measurement of the Residual Amount of Acrylic Acid and Residual Maleic Acid]

Measurement of the amount of residual acrylic acid and residual maleic acid was carried out by using the liquid chromatography on the condition described in the following Table 1.

TABLE 1

| Equipment | L-7000 series: manufactured by Hitachi, Ltd. |
|---|---|
| Detector | UV detector L-7400: manufactured by Hitachi, Ltd. |

TABLE 1-continued

| Column | Shodex RSpak DE-413: manufactured by Showa Denko K.K. |
|---|---|
| Flow rate | 1.0 ml/min |
| Colum temperature | 40° C. | molecular weight of before reflux and after reflux was calculated using the following formula.

$$\text{Rate of change} = |\{(Mn_0 - Mn_1)/Mn_0\} * 100|$$

$Mn_0$: number average molecular weight before reflux;
$Mn_1$: number average molecular weight after reflux Results are shown in the following Table 3.

TABLE 3

|  | Example 1-(1) | Example 1-(2) | Example 1-(3) | Comparative Example 1-(1) | Comparative Example 1-(2) | Comparative Example 1-(3) |
|---|---|---|---|---|---|---|
| Mn before Reflux | 5911 | 5602 | 5588 | 4713 | 4642 | 4574 |
| Mn after Reflux | 5731 | 5659 | 5254 | 3965 | 3770 | 3858 |
| Rate of change (%) | 3.0 | 1.0 | 6.0 | 15.9 | 18.8 | 15.7 |

TABLE 1-continued

| Mobile phase | 0.1% aqueous solution of phosphoric acid |
|---|---|

[Evaluation Method: Change of Number Average Molecular Weight by Accelerated Hydrolysis Test]

(1) 69 g of the polymer obtained in example 1 was diluted with 81 g of water, and the resulting aqueous solution was adjusted to pH 2.7 (hereinafter, referred as example 1-(1)). By using this solution, solution adjusted to pH 6.0 (hereinafter, referred as example 1-(2)) and solution adjusted to pH 10.0 (hereinafter, referred as example 1-(3)) with aqueous solution of sodium hydroxide (48% by weight) were prepared. Number average molecular weight of each sample was measured. Similarly, 69 g of the polymer obtained by comparative example 1 was diluted with 81 g of water, and the resulting aqueous solution was adjusted to pH 2.7 (hereinafter, referred as comparative example 1-(1)). By using this solution, solution adjusted to pH 6.0 (hereinafter, referred as comparative example 1-(2)) and solution adjusted to pH 10.0 (hereinafter, referred as comparative example 1-(3)) with aqueous solution of sodium hydroxide (48% by weight) are prepared. Number average molecular weight of each sample was measured.

Number average molecular weight was measured by GPC. Incidentally, measuring condition, equipment etc. are shown in the following Table 2.

TABLE 2

| Equipment | L-7000 series: manufactured by Hitachi, Ltd. |
|---|---|
| Detector | RI detector L-7490: manufactured by Hitachi, Ltd. |
| Column | Shodex Asahipak GF310-HQ/GF710-HQ/GF-1G 7B: manufactured by Showa Denko K.K. |
| Colum temperature | 40° C. |
| Mobile phase | 0.1M sodium acetate/acetonitrile = 3/1 (mass ratio) aqueous solution |
| Flow rate | 0.5 ml/min |

(2) After each sample prepared in (1) was hydrolyzed for 3 hours at reflux temperature (99 to 102° C.), number average molecular weight of each sample was measured. Incidentally, hydrolysis was carried out in the reaction vessel used in the above examples. Rate of change between number average From the above results, amount of residual acrylic acid of the hydrophilic graft polymer of the present invention was less than 200 ppm, and rate of change of number average molecular weight was very low. Therefore, amount of residual unsaturated carboxylic acid was reduced in the hydrophilic graft polymer of present invention, and the hydrophilic graft polymer of present invention was shown to have the excellent storage stability.

Incidentally, the present application is based on Japanese Patent Application Number 2006-221267 filed on Jul. 10, 2006, disclosure content thereof is hereby incorporated by reference in its entirety.

The invention claimed is:

1. A hydrophilic graft polymer prepared by a process comprising the steps of:
    graft polymerizing monomer components, which include unsaturated monocarboxylic acids, onto a polyalkylene oxide in a reactor to yield a hydrophilic graft polymer having side chain moieties, and
    treating the hydrophilic graft polymer in the reactor with a peroxide or azo-based compound to maximize conversion of the monomer components into the side chain moieties,
    wherein more than 90 mole % of the side chain moieties originate from the unsaturated monocarboxylic acids, and, at the end of the treating step, the residual amount of the unsaturated monocarboxylic acid, relative to the total amount of the hydrophilic graft polymer, is less than 200 ppm by mass.

2. The hydrophilic graft polymer according to claim 1, wherein a rate of a change of number average molecular weight, after 3 hours under refluxing condition, is 10% or less.

3. The hydrophilic graft polymer according to claim 1, wherein the side chain consists of a moiety derived from the unsaturated monocarboxylic acid.

4. The hydrophilic graft polymer according to claim 1, wherein number average molecular weight thereof is 1,000 to 1,000,000.

5. The hydrophilic graft polymer according to claim 1, wherein number average molecular weight of the polyalkylene oxide is 100,000 or less.

6. The hydrophilic graft polymer according to claim 1, wherein the unsaturated monocarboxylic acid is (meth) acrylic acid.

7. A method for producing a hydrophilic graft polymer comprising the steps of:
  graft polymerizing monomer components, which include unsaturated monocarboxylic acids, onto a polyalkylene oxide in a reactor to yield a hydrophilic graft polymer having side chain moieties, wherein more than 90 mole % of the side chain moieties originate from the unsaturated monocarboxylic acids, and
  treating the hydrophilic graft polymer in the reactor with a peroxide or azo-based compound to maximize conversion of the monomer components into the side chain moieties.

8. The hydrophilic graft polymer according to claim 2, wherein the side chain consists of a moiety derived from the unsaturated monocarboxylic acid.

9. The hydrophilic graft polymer according to claim 2, wherein number average molecular weight thereof is 1,000 to 1,000,000.

10. The hydrophilic graft polymer according to claim 3, wherein number average molecular weight thereof is 1,000 to 1,000,000.

11. The hydrophilic graft polymer according to claim 8, wherein number average molecular weight thereof is 1,000 to 1,000,000.

12. The hydrophilic graft polymer according to claim 2, wherein number average molecular weight of the polyalkylene oxide is 100,000 or less.

13. The hydrophilic graft polymer according to claim 3, wherein number average molecular weight of the polyalkylene oxide is 100,000 or less.

14. The hydrophilic graft polymer according to claim 4, wherein number average molecular weight of the polyalkylene oxide is 100,000 or less.

15. The hydrophilic graft polymer according to claim 8, wherein number average molecular weight of the polyalkylene oxide is 100,000 or less.

16. The hydrophilic graft polymer according to claim 9, wherein number average molecular weight of the polyalkylene oxide is 100,000 or less.

17. The hydrophilic graft polymer according to claim 10, wherein number average molecular weight of the polyalkylene oxide is 100,000 or less.

18. The hydrophilic graft polymer according to claim 11, wherein number average molecular weight of the polyalkylene oxide is 100,000 or less.

* * * * *